United States Patent
Matsuura

[11] 3,913,929
[45] Oct. 21, 1975

[54] LOW CENTER OF GRAVITY CYCLE

[76] Inventor: Hideji Matsuura, Suite 505, 17-17 Mita 4-chrome, Minato, Tokyo, Japan

[22] Filed: Mar. 11, 1974

[21] Appl. No.: 450,230

[30] Foreign Application Priority Data
June 8, 1973 Japan.............................. 48-22208

[52] U.S. Cl............. 280/7.14; 280/1.11 R; 280/261; 280/269; 280/282; 280/16
[51] Int. Cl.²..................... B62K 23/06; B62M 1/06
[58] Field of Search........... 280/259, 260, 261, 269, 280/282, 1.11 R, 7.14, 16

[56] References Cited
UNITED STATES PATENTS

| | | |
|---|---|---|
| 283,697 | 8/1883 | Branham............................ 280/260 |
| 1,652,049 | 12/1927 | Roberts........................... 280/87.01 |
| 2,789,831 | 4/1957 | Verick............................ 280/282 X |
| 3,429,584 | 2/1969 | Hendricks.......................... 280/269 |
| 3,561,778 | 2/1971 | LaBrie.............................. 280/269 |

FOREIGN PATENTS OR APPLICATIONS

| | | |
|---|---|---|
| 239,664 | 12/1959 | Australia........................ 280/1.11 R |
| 320,205 | 10/1929 | United Kingdom................ 280/269 |
| 501,515 | 11/1954 | Italy.................................... 280/261 |
| 709,378 | 5/1931 | France............................... 280/261 |
| 1,311,763 | 11/1962 | France............................... 280/261 |

*Primary Examiner*—Leo Friaglia
*Attorney, Agent, or Firm*—Armstrong, Nikaido & Wegner

[57] ABSTRACT

A low center-of-gravity cycle is provided in which the rider is supported in a substantially lying position on a rider support member mounted on the body of the cycle. Front wheels mounted on the front of the body are used to steer the cycle while a single wheel mounted on the rear of the cycle is used to drive the cycle. The cycle is extremely stable and reduces rider fatigue because of the substantially lying position of the rider which brings about the low center-of-gravity and less air resistance.

7 Claims, 8 Drawing Figures

FIG. 6
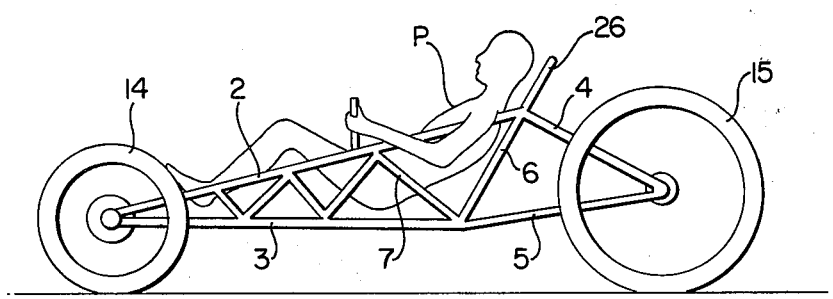
FIG. 7
FIG. 8
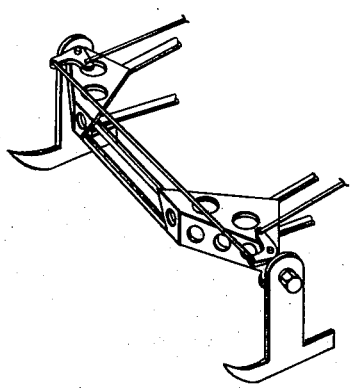

LOW CENTER OF GRAVITY CYCLE

BACKGROUND OF THE INVENTION

1. Field of the Invention

The present invention relates to a low center-of-gravity cycle comprising two front surface touching means such as steering wheels and at least one rear drive wheel for stabilizing a body thereof. The cycle has a rider support means such as a seat whereon a rider can sit at an extremely low position like a racing car driving position in such a manner that he lies substantially on his back. The seat is attached to a body having a side member frame, or panel frame, preferably symmetrical on both sides, comprising metal pipes, rods and plate means made of aluminum, steel and similar materials or molds of synthetic resin.

2. Description of the Prior Art

The conventional tricycles for children are moved by directly pushing the pedal down to drive the front wheel, and similarly the conventional ones for adults are moved by pedaling to drive the two rear wheels. The disadvantage with both types of tricycles is that a rider is positioned high on a saddle or seat such that he must unavoidably bend the upper half of his body or be in an almost upright posture as with typical bicycles. As a consequence, the weight of the upper half of the rider is concentrated on his buttocks resulting in a gradual increase of fatigue due to load concentration during cycling. This causes an intense pain in the rider's legs.

The disadvantage with conventional bicycles is that they are unstable because of two wheels and require training to a certain degree of skill for the rider until he can drive freely.

Furthermore, conventional stable-type cycles are generally used for children or physically handicapped persons and are not operated as an ordinary bicycle.

SUMMARY OF THE INVENTION

It is an object of the present invention to provide various types of low center of gravity cycles which are improved by solving the abovementioned disadvantages and are inexpensive. The cycles are low in the center of gravity and very high in stability both at high and low speeds as well as during braking, thus permitting anyone, young and old, men and women alike, to enjoy healthful cycling for games, matchs and play as well as general transportation without requiring training or skill.

BRIEF DESCRIPTION OF THE DRAWINGS

FIG. 6 is a side view illustrating how a rider is seated on the cycle in accordance with the present invention.

FIG. 7 illustrates skis which may be used in place of the front wheels of the cycle.

FIG. 8 illustrates skate blades which may be used in place of the front wheels of the cycle.

DESCRIPTION OF THE PREFERRED EMBODIMENT

Figure 1:
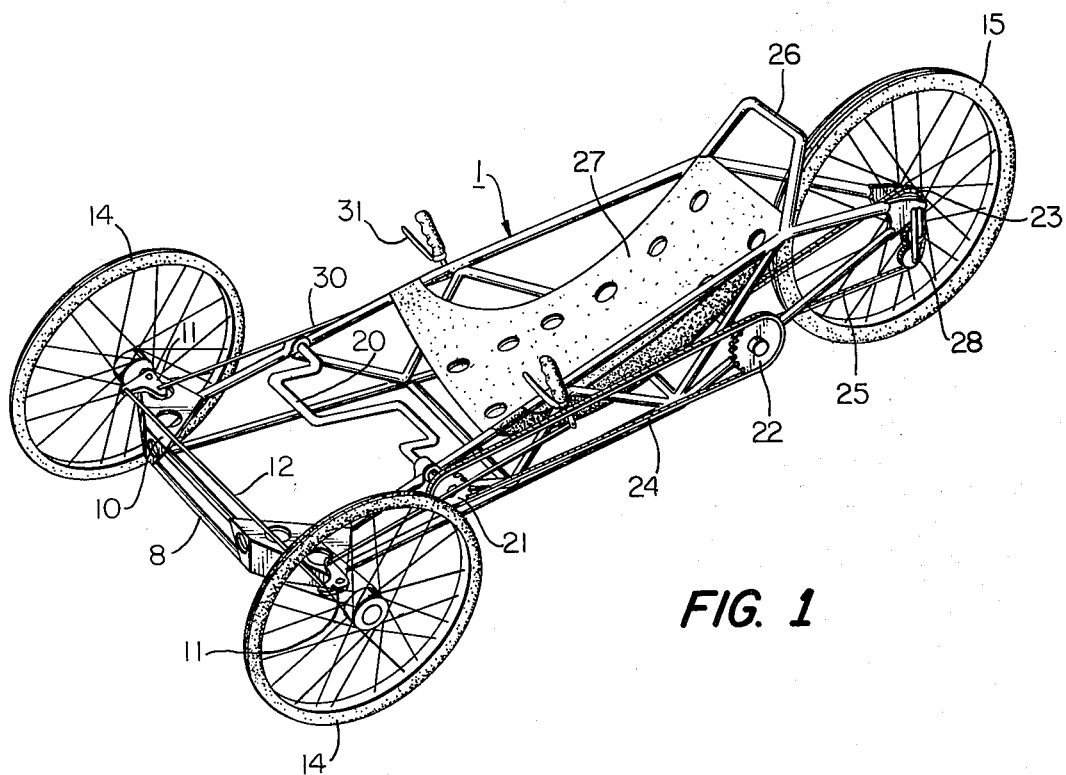
FIG. 1 is a perspective view showing an embodiment of the present invention.
Figure 2:
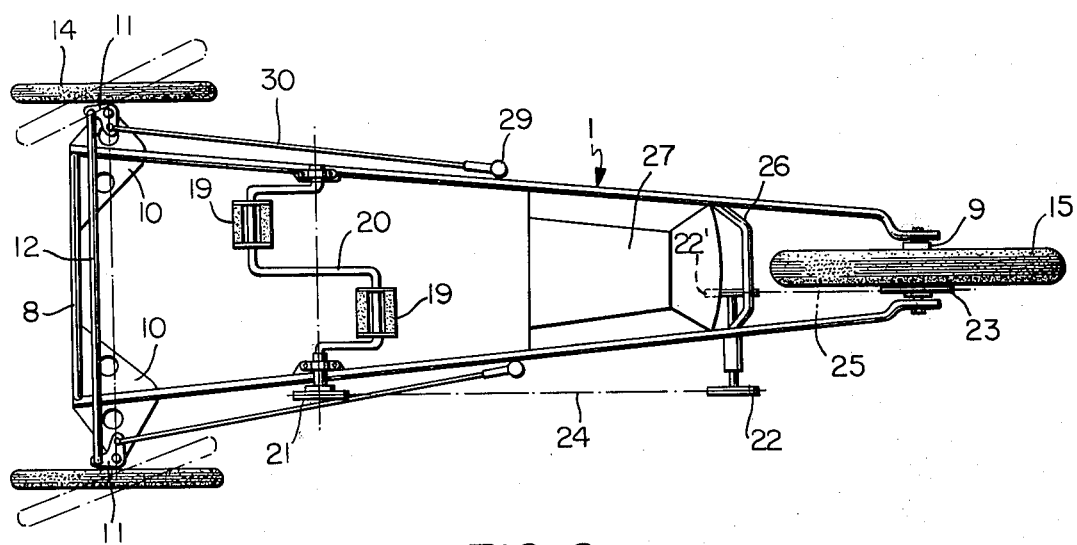
FIGS. 2 and 3 are respectively plan view and a side view of the embodiment shown in FIG. 1.
Figure 3:
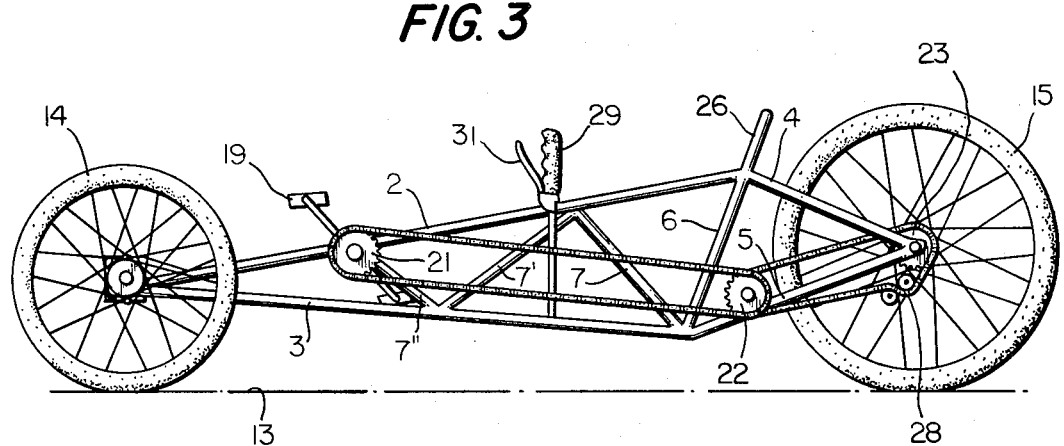

In FIGS. 1, 2 and 3, cycle body 1 is formed of pipe frame, which has a side member frame of pipe made of aluminum, steel or similar metal of very light weight and high hardness. The frame is substantially symmetrical with respect to both sides. As shown in FIG. 3, the side member frame is constructed by combining into a single unit by welding or some other means, a front upper member 2 and a front lower member 3 located at the front portion of the body 1 with a rear upper member 4 and a rear lower member 5 located at the rear portion of the body 1 along with a center member 6 inclined at an angle to the rear direction of the body 1. In combination with the front upper member 2 with the front lower member 3 are a plurality of diagonal members, 7, 7' and 7".

The front ends of the above-mentioned symmetrical side member frames, that is, the front ends of preferably separated right and left front lower members 3 are rigidly connected together by means of a front cross member 8.

A rear wheel shaft 9 is fitted on the rear ends of the side member frames, in the vicinity of the cross point of the right and left rear upper members 4 and rear lower members 5. The rear ends are positioned fairly close to each other as compared to the front ends, as shown in the drawings.

The body 1 may be constructed of aluminum plate, steel plate, or other similar metal plate or by molding of synthetic resin instead of the abovementioned pipe frame.

On each front side end of the body 1 is fitted a guide arm support 10, which supports a vertical shaft (not shown) or a preferably aligned shaft, on which a guide arm 11 is rotatably fixed. The right and left guide arms 11 are connected together by means of a tie rod 12 or similar means. A wheel 14 is coupled by means of a shaft to each guide arm 11. Each wheel 14 has a well-known brake drum fitted with a number of spokes for supporting a rim covered with an air-filled tire for moderating shocks from road surface 13 (see FIG. 3). The abovementioned rear wheel shaft 9 supports a drive wheel 15 on a bearing.

Figure 4:
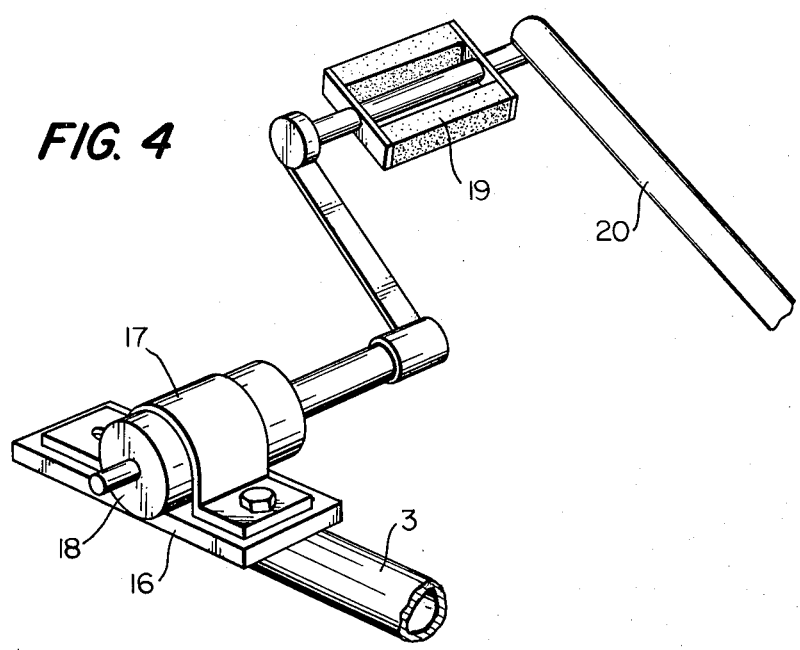
FIG. 4 is an enlarged perspective view of one half of a crank shaft 20.
Figure 5:
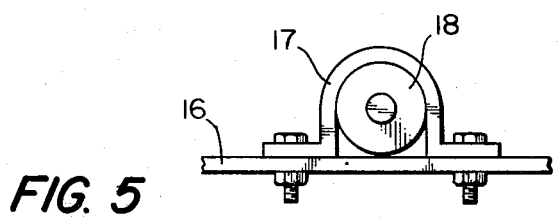
FIG. 5 is a side view of a portion of FIG. 4.

A drive mechanism for driving the drive wheel 15 is devised as described below with reference to FIGS. 4 and 5. Body 1 is secured to a washer plate 16 (with welding or in another way) on which a bearing 18 is fixed by means of screws and nuts through a bearing holder 17. The bearing 18 rotatably supports the respective ends of a crank shaft 20 fitted with a pair of pedals 19. A primary sprocket 21 is fixed on a rotating shaft, extend- from one end of the crank shaft 20. A primary chain 24 is engaged on the primary sprocket 21 and an idle sprocket 22 is provided in the drive mechanism.

A secondary chain 25 is engaged on the secondary sprocket 22' and a drive sprocket 23 for driving the drive wheel 15 in a similar manner as described above. Gear ratios of the above sprockets are selectable and adjustable.

The rotation of the crank shaft 20 may be transmitted to the drive wheel 15 by using a belt, shaft, rod, or similar means instead of the above sprockets and chains.

In order to take full power of the rider's legs through the crank shaft 20 when his feet alternately push the pair of right and left pedals 19, the body 1 is covered with a seat 27 made of cloth, synthetic resin sheet, metal plate, or similar material, as shown in the drawing, so that he can effectively stay in a low riding posture as he substantially lies on his back. The seat 27 is so shaped that the reaction of the foot's pedaling force can be received by the back of the seat 27 to which his back is pressed. A roll-over bar 26 is bridged across the rear frame of the body 1 and above the seat 27 to prevent the cycle from rolling over. Should the cycle roll over, the bar 26 will serve to protect the rider's head. A speed change mechanism 28 fitted in the cycle of the present invention is one used for conventional bicycles.

A steering lever handle 29 is fitted on the front upper member 2 of the body 1. An independent handle 29 is provided on each side. The lever handle 29 is linked to a guide arm 11 through a link mechanism of a wire and other means 30 of the steering system. The lever handle 29 can turn to the guide arm 11 to a given direction to permit the pair of shaft mounted wheels 14 to move in parallel. This makes the steering operation easy in any direction. The guide arm 11 may be turned by a conventional steering system comprised of round handle or lever handle instead of the lever handle 29.

The braking system, which is not shown, has a brake lever 31 adjacent to the grip of each lever handle 29 as with conventional bicycles. The brake lever 31, when pressed, pulls a wire or the like to friction brake the rims of the front and rear steering wheels and drive wheel, brake drum, or brake disc.

As clearly seen from the above description of the embodiment, the cycle according to the present invention consists of: first, the body provided with the front cross member to connect the front ends or adjacent portions thereof of the side member frames or panel frames formed symmetrically on both sides. This enables the rider to sit in a very low position as in lying on his back. The cycle has a rear wheel shaft at the rear end, and guide arms which are rotatably supported around the vertical shafts supported by the respective guides arm supports arranged at both sides of the front end of the body. The guide arms are connected together by a tie rod or the like. A pair of shaft-equipped steering wheels are fitted to the respective guide arms, and the drive wheel are supported by the rear wheel shaft with bearings and are driven by a drive mechanism. The drive mechanism includes a crank shaft, having the pair of pedals one on each side, which is fitted on the body. A roll-over bar is positioned across the rear portion of the body and above the seat to insure safety of the rider when the cycle rolls over. A steering link mechanism, comprising a wire, rod or other means, is linked with the guide arms, thereby permitting parallel movement of the pair of steering wheels through the guide arms. Therefore, the cycle according to the present invention is low in its center of gravity and high in stability, and it can be used for sports and other special services as well as general cycling. In addition, it is very light in weight, easy to handle and high in durability.

Furthermore, as shown in FIG. 6, the rider P can remain in a low position in the cycle body such that his weight is broadly distributed throughout the seat. Therefore, the rider is free from any pain at his buttocks due to concentrated load, thus greatly reducing fatigue during cycling and allowing him to rest while remaining in the driving posture.

Furthermore, since the rider lies in a very low position the frontal area is reduced thereby reducing the air resistance by about 25 to 80 percent of the running resistance of conventional riders and bicycles. In addition, since the reaction to the pedaling force of both feet of the rider is received by the back of the seat to which the rider's back is fitted, the force of the whole body can be effectively utilized for pedaling.

Furthermore, the steering mechanism is not required to be high and the strength and difficulty in balancing the weight of the rider's body due to pedaling is eliminated. The steering lever handles are preferably located in the vicinity of his hands in his natural seating posture.

Furthermore, a plurality of screw fitting holes can be additionally bored on the washer plate 16 and bearing holder 17 to adjust the position of the crank shaft according to the height of the rider, if required. This is very effective for the users.

The steering wheels 14' can be replaced by skis 14' for using the cycle in snow or by skate blades 14" for using the cycle on ice.

The present invention may be embodied in other specific forms without departing from the spirit of or essential characteristics thereof. The presently disclosed embodiments are therefore to be considered in all respects as illustrative and not restrictive, the scope of the invention being indicated by the appended claims rather than the foregoing description, and all changes which come within the meaning and range of equivalency of the claims are therefore intended to be embraced therein.

I claim:

1. A low center of gravity cycle comprising:
   a. body means including first and second side members and coupling members coupling said first and second side members;
   b. rider support means mounted on said body means for supporting the rider of said cycle in a substantially lying position;
   c. surface touching means mounted on the front of said body and touching the surface below said cycle and operatively connected to said body means for supporting said body means above the surface;
   d. wheel means mounted on the rear of said body means wherein said body means is positioned below the plane parallel to the surface through the top of said wheel means such that the center of gravity of said cycle with the rider in said rider support means, lies below said plane;
   e. pedal means positioned to be operated by the rider's feet;
   f. drive linkage means coupling said wheel means to said pedal means wherein the operation of said pedal means by the driver drives said wheel means thereby causing said cycle to move along said surface; and
   g. steering means mounted on said body and positioned to be operated by the rider and coupled to said surface touching means for steering said cycle.

2. The cycle of claim 1 wherein said first and second side members each comprise tubular structural members.

3. The cycle of claim 1 wherein said first and second side members each comprise plate members.

4. The cycle of claim 1 wherein said surface touching means are wheels.

5. The cycle of claim 1 wherein said surface touching means are skis.

6. The cycle of claim 1 wherein said surface touching means are skate blades.

7. The cycle of claim 1 wherein said steering means comprises:
   a. manually operated handles means positioned to be held by the rider; and,
   b. steering linkage means coupling said handle means to said surface touching means such that movement of said handle means causes a corresponding movement of said surface touching means thereby changing the direction of movement of said cycle.

* * * * *